July 21, 1970           H. P. SMITH           3,521,047
FLUORESCENT YARD LIGHT WITH ILLUMINATED INDICIA
Filed April 3, 1967           3 Sheets-Sheet 1
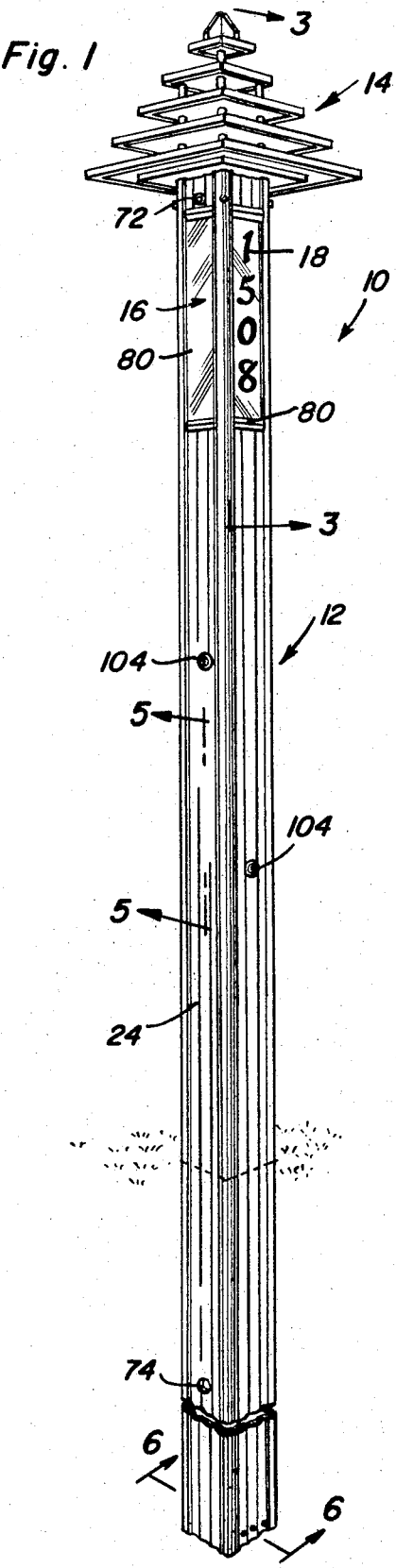
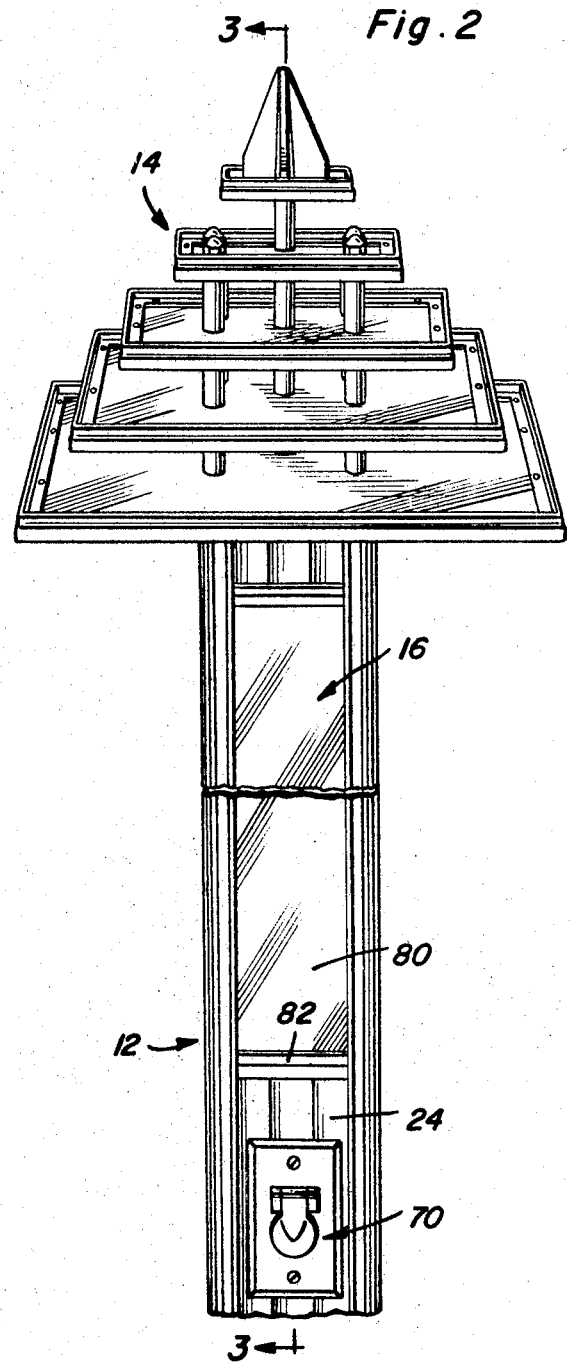
Harold P. Smith
INVENTOR.
BY Clarence A. O'Brien
and Harvey B. Jacobson
Attorneys July 21, 1970  H. P. SMITH  3,521,047
FLUORESCENT YARD LIGHT WITH ILLUMINATED INDICIA
Filed April 3, 1967  3 Sheets-Sheet 2
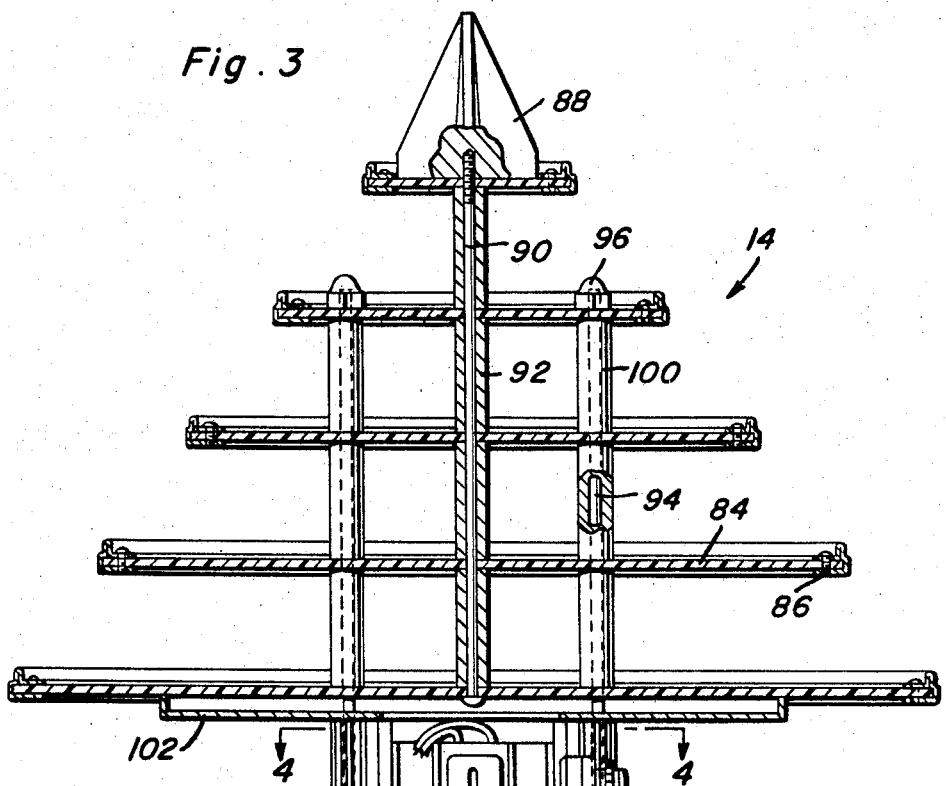
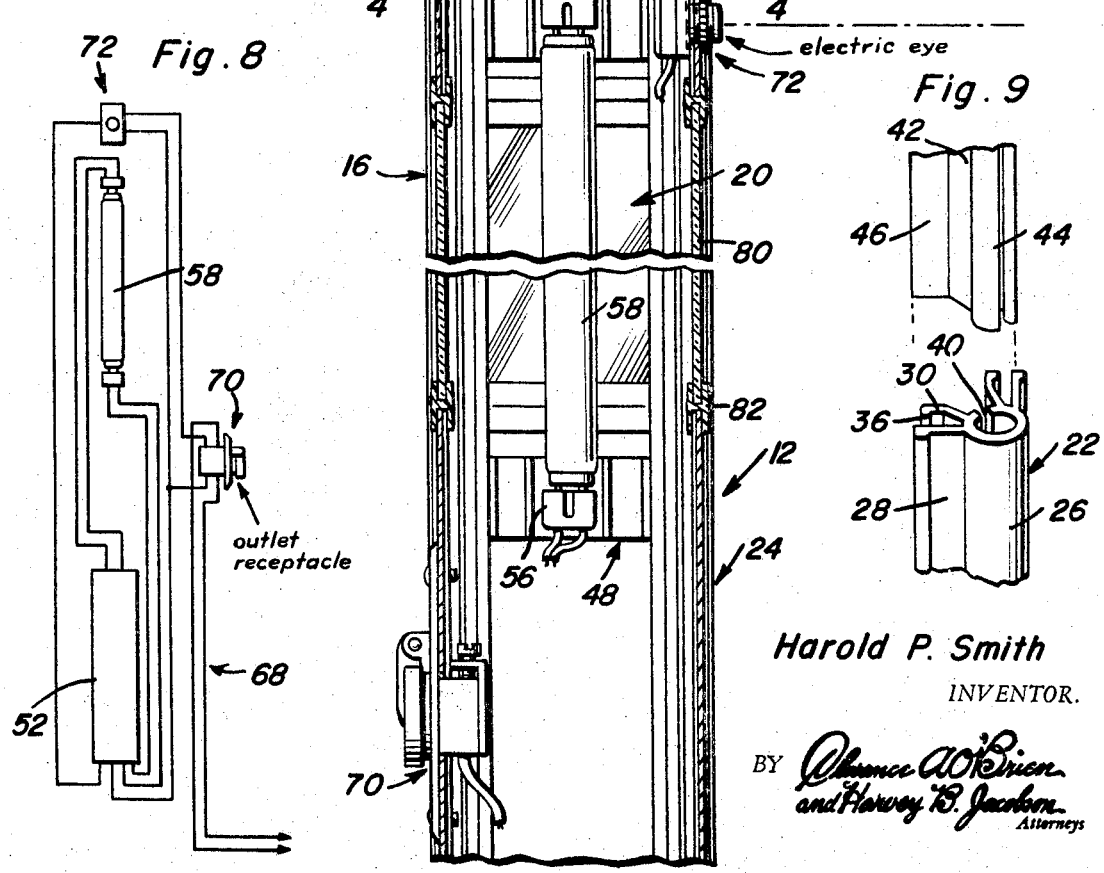
Harold P. Smith
INVENTOR.

July 21, 1970  H. P. SMITH  3,521,047
FLUORESCENT YARD LIGHT WITH ILLUMINATED INDICIA
Filed April 3, 1967  3 Sheets-Sheet 3
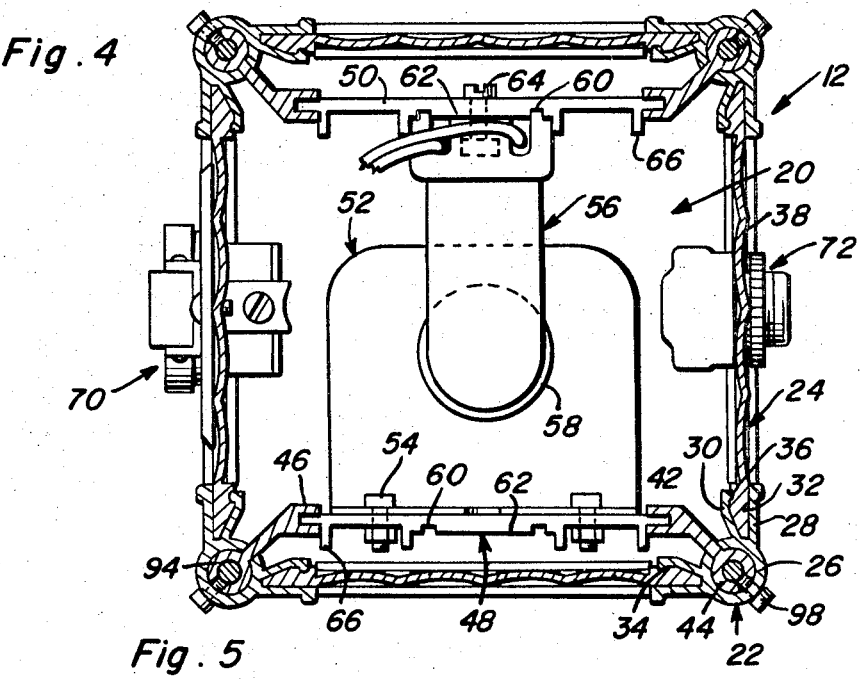
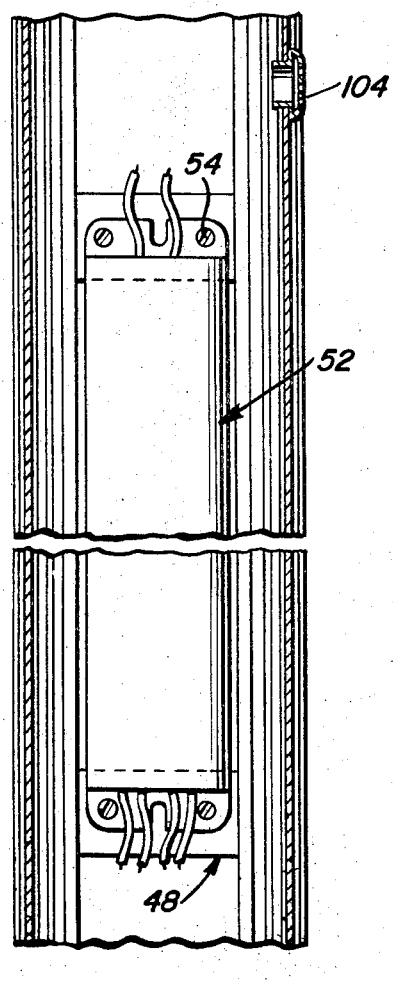
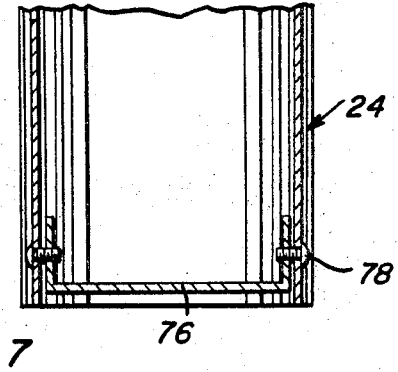
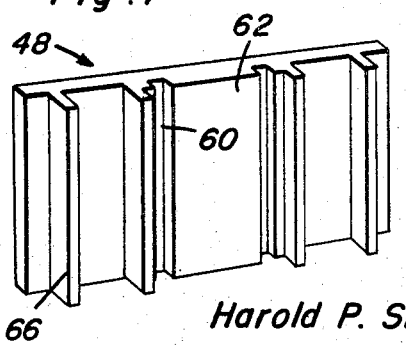
Harold P. Smith
INVENTOR.

United States Patent Office 3,521,047
Patented July 21, 1970

3,521,047
FLUORESCENT YARD LIGHT WITH
ILLUMINATED INDICIA
Harold P. Smith, Box 38, Panhandle, Tex. 79068
Filed Apr. 3, 1967, Ser. No. 628,060
Int. Cl. F21p 5/00
U.S. Cl. 240—3
17 Claims

ABSTRACT OF THE DISCLOSURE

An illuminated signpost has light emitting panels adjacent an upper end mounted below a decorative head. The panels enclose a fluorescent type of lamp assembly. The post is formed from extruded metallic corner columns, interconnecting vertical side walls and internally supporting the components of the lamp assembly. The side walls of the post are assembled between locking projections that extend from the corner columns.

BACKGROUND OF THE INVENTION

This invention relates generally to illuminated lampposts and in particular to an improved lamppost embodying various structural features and mounting a fluorescent type source of light.

The construction of the present invention is such as to provide for glare-proof illumination at a low operating cost with reduced maintenance. Further, illumination from the lamppost is rendered more reliable and weather resistant because of the use of heavy extruded aluminum and fiber glass forming a dustproof, protective enclosure for the lamp. The post may nevertheless be assembled and installed with minimum effort and expense.

In accordance with the foregoing, the lamppost of the present invention is formed by vertical corner columns interlocked with interconnecting side walls, the outer surfaces of which are non-planar to increase the rigidity of the assembled post as well as to provide a more pleasant appearance. Window openings are formed in the walls and are closed by transparent or translucent panels through which illumination is emitted and on which readily visible indicia is mounted such as house numbers or names. The corner columns which are made of extruded aluminum, also internally support mounting members to which a fluorescent tube is secured as well as the ballast device associated therewith. A decorative head assembly is rigidly secured to the top of the post and easily disassembled therefrom so as to protectively enclose the lamp within the post as well as to enhance the decorative appearance of the entire lamppost assembly. The lamppost assembly may be firmly anchored in the ground without the use of concrete anchors and may also provide an outlet receptacle from which electrical energy may be taken for any desired purpose.

These together with other objects and advantages which will become subsequently apparent reside in the details of construction and operation as more fully hereinaftei described and claimed, reference being had to the accompanying drawings forming a part hereof, wherein like numerals refer to like parts throughout.

BRIEF DESCRIPTION OF THE DRAWING FIGURES

FIG. 1 is a perspective view illustrating a lamppost assembly constructed in accordance with the present invention.

FIG. 2 is an enlarged perspective view of the upper portion of the lamp assembly shown in FIG. 1.

FIG. 3 is a longitudinal sectional view through the upper portion of the lamppost assembly taken substantially through a plane indicated by section line 3—3 in FIG. 2.

FIG. 4 is an enlarged transverse sectional view taken substantially through a plane indicated by section line 4—4 in FIG. 3.

FIG. 5 is an enlarged partial sectional view taken substantially through a plane indicated by section line 5—5 in FIG. 1.

FIG. 6 is an enlarged partial sectional view taken substantially through a plane indicated by section line 6—6 in FIG. 1.

FIG. 7 is a perspective view showing one of the internally mounted support plates associated with the lamppost assembly.

FIG. 8 is an electrical circuit diagram showing the lighting circuit for the post assembly.

FIG. 9 is a perspective view showing disassembled portions of the post assembly.

Referring now to the drawings in detail, it will be observed from FIG. 1 that the illuminated lamppost generally denoted by reference numeral 10, includes a vertically elongated post assembly 12 the lower portion of which is adapted to be anchored or embedded in the ground. A decorative head assembly 14 is secured to and mounted on top of the post assembly 12 vertically spaced above window portions 16 on which indicia 18 such as house numbers are mounted. Illuminating means generally denoted by reference numeral 20 is mounted internally within the post assemby as more clearly seen in FIG. 3, in alignment with the window portion 16 so as to emit light therethrough rendering the indicia 18 clearly visible at night as well as to provide general illumination in the immediate vicinity of the post.

Referring now to FIGS. 4 and 9, in particular, it will be observed that the post assembly 12 is non-circular in cross-sectional shape and in the illustrated embodiment forms in cross-section a rectangle or square. The cross-sectional configuration is therefore formed externally by a plurality of corner column members or molding 22 interconnected by vertical side wall panels 24. Each corner column is made of a relatively heavy extruded aluminum section and includes a tubular portion 26 from which a pair of framing elements 28 extend at an angle to each other. In the illustrated embodiment, the framing elements 28 are disposed at right angles to each other in view of the rectangular cross-section of the post assembly. It will therefore be appreciated that the angular relationship of the framing elements 28 will depend upon the number of sides associated with the post assembly. Also projecting from the tubular portion 26 of each corner column are a pair of relatively deflectable elements 30 angularly spaced from the framing elements 28 so as to lock the longitudinal end portions 32 associated with the vertical walls 24 against the framing elements 28. The end portions 32 are therefore provided with longitudinal recesses or grooves 34 adapted to receive locking projections 36 formed on the ends of the deflectable locking elements 30. The vertical walls are assembled between adjacent corner columns 22 and interlocked therewith to form a rigid assembly. The longitudinal end portions 32 of each wall are therefore tapered and are relatively thick as compared to the intermediate, corrugated portion 38. Thus, the intermediate portion 38 of the vertical walls are exposed between the framing elements 28 presenting a non-planar surface which enhances the rigidity of the post assembly as well as its appearance.

The tubular portion 26 of each of the corner columns is provided on the inside with a gap 40 through which support arms 42 extend, said support arms projecting radially from contractible tubular elements 44 received within the tubular portion 26 of the corner columns. The tubular elements 44 and support arms 42 projecting therefrom may also be formed from extruded aluminum and may be readily assembled within the corner columns at desired longitudinal locations in order to mount the components associated with the lamp assembly 20. The support arms 42 are thicker than the elements 28 and 30 as shown in FIG. 4 and are formed with slotted end portions 46 that project toward each other from adjacent corner columns 22. The end portions 46 are aligned so as to receive therebetween, a mounting plate 48 as more clearly seen in FIGS. 4 and 7. A plurality of such mounting plates 48 are thereby suspended between corner columns in spaced adjacency to opposite vertical walls 24 as shown in FIG. 4 and also in longitudinally spaced relation along these walls as shown in FIGS. 3 and 5 in order to mount the components of the lamp assembly 20 internally of the post assembly.

Each mounting plate 48 includes a planar side 50 to which a ballast component 52 may be secured by fastener assemblies 54 as shown in FIGS. 4 and 5 adjacent to one of the vertical walls. The planar sides of the mounting plates 48 that mount the ballast component 52 do not face the adjacent wall so that they may mount the ballast component in spaced relation to the adjacent wall. A pair of longitudinally spaced mounting plates 48 are therefore so assembled between the support arms 42 at the proper vertical height within the post assembly for supporting the ballast component. Another pair of longitudinally spaced mounting plates 48 are suspended between the corner columns adjacent the vertical wall opposite the wall from which the ballast component is closely spaced, in order to mount the receptacles 56 receiving the fluorescent lamp tube 58. The fluorescent lamp tube is thereby mounted in alignment with the window portions 16. The mounting plates 48 from which the fluorescent tube 58 is supported, are assembled between the associated support arms 42 holding the planar sides 50 of the mounting plates facing the adjacent vertical wall in order to present the non-planar side of the mounting plates to the fluorescent tube receptacles 56. The non-planar sides of the mounting plates are therefore provided with spaced recesses 60 on either side of a central boss 62 adapted to firmly receive and seat the tube receptacles 56 which are secured to the mounting plates by the fastener assemblies 64. Also formed on the non-planar side of the mounting plates, closely spaced from the ends, are the abutments 66 engaged by the slotted end portions 46 of the support arms 42.

The fluorescent tube receptacles 56 and the ballast component 52 are wired to each other in a conventional lighting circuit as shown in FIG. 8 to which electrical energy is supplied through a power cable 68. The power cable 68 may be connected to the lighting circuit through an outlet power receptacle 70 of a conventional type adapted to be mounted at a desired height on one of the vertical side walls 24 of the post assembly as shown in FIGS. 2, 3 and 4. Also connected in the lighting circuit, is a photoelectric switch control 72 of a conventional type adapted to be mounted on one of the vertical walls 24 of the post assembly adjacent the upper end for example as shown in FIGS. 1 and 3. Electrical power may be brought to the lamp assembly under ground entering the post assembly below ground through an opening 74 formed in one of the vertical walls as shown in FIG. 1. Also, a base plate 76 may be secured to the vertical walls by means of fasteners 78 adjacent the lower end of the post assembly as shown in FIG. 6 in order to protectively close the bottom of the post assembly and accommodate firm anchoring thereof within the ground when embedded in the earth to a sufficient depth.

The vertical walls 24 are discontinuous adjacent the upper ends thereof so as to form window openings within which fiber glass panels 80 are mounted. Mounting clips 82 are therefore provided so as to interconnect adjacent horizontal edges of the panels 80 and the vertical walls 24 as more clearly seen in FIG. 3. The panels also extend horizontally between the corner columns so as to form a dustproof enclosure about the fluorescent lamp tube 58 in alignment therewith.

The upper end of the post assembly is closed by the head assembly 14 as aforementioned. The head assembly includes a plurality of vertically spaced, horizontal panels 84 of decreasing dimension in an upward direction, each panel being made of a material such as fiber glass having a metallic frame peripherally secured thereto. An ornamental top member 88 is assembled on the uppermost panel 84 and is threadedly connected to one end of an assembly bolt 90 which extends centrally through all of the panels. Tubular spacers 92 are mounted on the assembly bolt 90 between the panels so as to hold them in vertically spaced relation to each other. Side bolts 94 also extend through all but the uppermost panel in alignment with the corner columns 22. The bolts 94 are provided with heads 96 at the upper ends engaging the panel 84 just below the uppermost panel, the lower ends of the bolts 94 being received within the tubular columns 22 to which they are secured by means of the setscrews 98 as shown in FIG. 4. Spacing sleeves 100 are also mounted on the bolts 94 between the panels. The peripheral frame associated with the lowermost panel 84 includes a cover plate portion 102 through which the bolts 94 extend so that the head assembly 14 may be assembled on top of the post assembly in order to close the upper end.

The construction, installation and use of the illuminated lamppost will be apparent from the foregoing description. It will be appreciated therefore, that the post may be readily assembled from fiber glass panels and extruded metallic sections and more readily accessible parts in order to form a rigid, reliable and weather-resistant lamppost providing illumination. Because of the dustproof enclosure formed by the post assembly, the fluorescent lamp 20 will provide illumination for prolonged periods of time in a weather protected environment. The interior of the post asembly may however be vented to atmosphere through protective vents 104 mounted in the vertical side walls 24 as shown in FIGS. 1 and 5. The lamp may be turned on automatically by means of the photoelectric switch device 72 so as to illuminate the indicia 18 when insufficient natural light is available for illumination thereof. The lamppost assembly of the present invention will therefore find particular utility as a yard light or front signpost for private residences although not necesarily limited to such installations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A lighting fixture comprising, a vertically elongated post assembly having a plurality of vertical walls and corner columns interconnecting said walls, a head assembly removably mounted by said corner columns on top of said post assembly, light transmitting windows mounted by said walls adjacent the top of the post assembly, lamp means enclosed within the post assembly for emitting light through said windows and mounting means supported by said corner columns for mounting the lamp means internally of the post assembly in alignment with said windows, said lamp means comprising a vertically elongated fluorescent tube, vertically spaced receptacles mounting the tube adjacent the top of the post assembly, a ballast device wired to the tube receptacles and mounted in spaced relation therebelow, electrical supply means extending into the post assembly adjacent a lower end thereof, and photo-sensitive switch means mounted by one of said vertical walls and electrically connecting the power supply means to the tube receptacles and the ballast device for operation thereof.

2. The combination of claim 1 wherein each of said corner columns comprises a tubular member, a pair of locking devices extending from the tubular member at an angle to each other for locking engagement with adjacent walls, and tubular supporting elements received in the tubular member having arms extending inwardly from the tubular member angularly between the locking devices for engagement with the lamp mounting means.

3. The combination of claim 2 wherein each of said locking devices includes a relatively rigid framing element backing an edge portion of the wall and a relatively flexible deflection element having a locking projection engaging said edge portion of the wall.

4. The combination of claim 3 wherein the longitudinal edge portions of the vertical walls engageable by the corner columns have locking recesses therein receiving the locking projections, each of said walls including an intermediate portion having a non-planar surface configuration between the edge portions.

5. The combination of claim 4 wherein each of said windows includes a translucent panel extending between the locking devices of the corner columns and clip elements engaging the panels for connecting the same to the vertical walls above and below the panels.

6. The combination of claim 5 wherein said mounting means include a plurality of plate members having planar sides to which the ballast device is secured and non-planar sides formed with recesses receiving the tube receptacles and projections abutting the supporting elements of the corner columns.

7. The combination of claim 6 wherein said head assembly includes a plurality of horizontal panels, spacer elements vertically spacing said panels, and elongated fasteners extending through said spacer elements and panels into the tubular members of the corner columns holding the head assembly in assembled relation on the top of the post assembly.

8. The combination of claim 7 including vent plugs mounted in the walls of the post assembly.

9. A lighting fixture comprising, a vertically elongated post assembly having a plurality of opaque vertical walls and corner columns interconnecting said walls, light transmitting windows mounted by said walls adjacent the top of the post assembly, lamp means enclosed within the post assembly for emitting light through said windows and mounting means supported by said corner columns for mounting the lamp means internally of the post assembly in alignment with said windows, each of said corner columns comprising a tubular member, a pair of locking devices extending from the tubular member at an angle to each other for non-adhesive locking engagement with adjacent walls, and tubular supporting elements received in the tubular member having arms extending inwardly from the tubular member angularly between the locking devices for engagement with the lamp mounting means.

10. The combination of claim 9 wherein each of said locking devices includes a relatively rigid framing element backing an edge portion of the wall and a relatively flexible deflection element having a locking projection engaging an edge portion of the wall.

11. The combination of claim 10 wherein the longitudinal edge portions of the vertical walls engageable by the corner columns have locking recesses therein receiving the locking projections, each of said walls including an intermediate portion having a non-planar surface configuration between the edge portions.

12. The combination of claim 9 wherein longitudinal edge portions of the vertical walls are engageable by the corner columns and have locking recesses therein, each of said walls including an intermediate portion having a non-planar surface configuration between the edge portions.

13. The combination of claim 12 including vent plugs mounted in the walls of the post assembly.

14. The combination of claim 9 wherein said lamp means comprises a vertically elongated fluorescent tube, vertically spaced receptacles mounting the tube adjacent the top of the post assembly, a ballast device wired to the tube receptacles and mounted in spaced relation therebelow, and electrical supply means extending into the post assembly adjacent a lower end thereof.

15. The combination of claim 14 wherein said mounting means include a plurality of plate members having planar sides to which the ballast device is secured and non-planar sides formed with recesses receiving the tube receptacles and projections abutting the supporting elements of the corner columns.

16. A lighting fixture comprising, a vertically elongated post assembly having a plurality of vertical walls and corner columns interconnecting said walls, a head assembly removably mounted by said corner columns on top of said post assembly, light transmitting windows mounted by said walls adjacent the top of the post assembly, lamp means enclosed within the post assembly for emitting light through said windows and mounting means supported by said corner columns for mounting the lamp means internally of the post assembly in alignment with said windows, said head assembly including a plurality of horizontal panels, spacer elements vertically spacing said panels, and elongated fasteners extending through said spacer elements and panels into the corner columns holding the head assembly in assembled relation on the top of the post assembly.

17. The combination of claim 16 wherein each of said corner columns comprises a tubular member receiving one of said fasteners from the head assembly, a pair of locking devices extending from the tubular member at an angle to each other for locking engagement with adjacent walls, and tubular supporting elements received in the tubular member having arms extending inwardly from the tubular member angularly between the locking devices for engagement with the lamp mounting means.

References Cited

UNITED STATES PATENTS

| 2,021,347 | 11/1935 | Bailey | 40—132 |
| 3,207,893 | 9/1965 | Nado | 240—11.4 XR |
| 3,215,831 | 11/1965 | Gladsden | 240—84 |
| 3,366,785 | 1/1968 | Huber | 240—25 XR |
| 3,381,430 | 5/1968 | Wiczer | 52—282 |

NORTON ANSHER, Primary Examiner

L. H. McCORMICK, Jr., Assistant Examiner

U.S. Cl. X.R.

40—132; 52—282; 240—11.4, 25, 51.11